United States Patent
Camus et al.

(10) Patent No.: US 7,697,786 B2
(45) Date of Patent: Apr. 13, 2010

(54) METHOD AND APPARATUS FOR DETECTING EDGES OF AN OBJECT

(75) Inventors: Theodore Camus, Marlton, NJ (US); David Hirvonen, Portland, OR (US)

(73) Assignee: Sarnoff Corporation, Princeton, NJ (US)

( * ) Notice: Subject to any disclaimer, the term of this patent is extended or adjusted under 35 U.S.C. 154(b) by 1065 days.

(21) Appl. No.: 11/374,732

(22) Filed: Mar. 14, 2006

(65) Prior Publication Data

US 2006/0245653 A1    Nov. 2, 2006

Related U.S. Application Data

(60) Provisional application No. 60/661,368, filed on Mar. 14, 2005.

(51) Int. Cl.
  G06K 9/36  (2006.01)
  G06K 9/00  (2006.01)
  G06K 9/34  (2006.01)
  G06K 9/66  (2006.01)
  G06K 9/46  (2006.01)

(52) U.S. Cl. .............. 382/286; 382/104; 382/171; 382/173; 382/195; 382/203

(58) Field of Classification Search ........... 382/206, 382/286
  See application file for complete search history.

(56) References Cited

U.S. PATENT DOCUMENTS 4,851,984 A * 7/1989 Doi et al. .................. 382/108
5,072,384 A * 12/1991 Doi et al. .................. 382/132
5,555,555 A * 9/1996 Sato et al. .................. 382/104
5,771,308 A * 6/1998 Florent ..................... 382/130
5,790,690 A * 8/1998 Doi et al. .................. 382/128
6,775,399 B1 * 8/2004 Jiang ........................ 382/128
6,859,705 B2 * 2/2005 Rao et al. .................. 701/45
7,352,888 B2 * 4/2008 Luo et al. .................. 382/132
2002/0034338 A1 * 3/2002 Askary ...................... 382/295
2004/0136610 A1 * 7/2004 Knox ........................ 382/286

* cited by examiner

*Primary Examiner*—Bhavesh M Mehta
*Assistant Examiner*—Gandhi Thirugnanam
(74) *Attorney, Agent, or Firm*—Lowenstein Sandler PC

(57) ABSTRACT

The present invention provides a system and method for detecting edges of an object in a pre-crash sensing environment. The method includes extracting vertical edges from peaks in an array of column sums of absolute values of normalized horizontal derivates computed in the intensity image. The pixels with corresponding range image depths proximate the estimated object's closest surface contribute the column sums. The search is conducted for all likely combinations of left/right edge pairs preferably within a pre-determined horizontal range about the object's detected center. The left/right edge pairs that delimit a width within the pre-determined range of possible widths for the object are selected. Alternatively, an additional search is performed on each pair of edges to support any angular or inward slant on the edges of the object.

37 Claims, 4 Drawing Sheets

METHOD AND APPARATUS FOR DETECTING EDGES OF AN OBJECT

CROSS-REFERENCE TO RELATED APPLICATIONS

This application claims the benefit of U.S. provisional patent application No. 60/661,368 filed Mar. 14, 2005, which is incorporated herein by reference.

FIELD OF THE INVENTION

The present invention relates to a general technique for detecting the depth and edges of an object in an image, particularly to determine a width of an object from a pair (or larger number) of edges.

BACKGROUND OF THE INVENTION

Over the past decades developments in passive safety devices have resulted in a significant reduction of fatalities and injuries in road accidents. A further reduction is expected from intelligent safety devices that use anticipatory sensors like radar, camera or infrared. In these so-called pre-crash sensing (PCS) systems the time-span between observation of a possible crash event and the actual occurrence is used to increase the effectiveness of the safety device. The safety devices may include modules for vehicle control, adaptable interior or exterior structures, restraint systems or any combinations of these. For the development of the PCS systems, new numerical tools and test methods such as improvements in the designing of the sensor system have been commonly known.

The pre-crash sensing (PCS) system typically utilizes a sensor system for detecting objects in front of a vehicle or platform. In general, a platform can be any of a wide range of bases, including a boat, a plane, an elevator, or even a stationary dock or floor. The sensor system may include radar, an infrared sensor or another detector. In any event, the sensor system generates an image of an object and the background. By processing that imagery, dimensions of the object can be detected.

Furthermore, the pre-crash sensing (PCS) system uses object dimensions (width, height and length) to support classification of detected objects. The distributions of typical vehicle and pedestrian heights are too similar to use for robust classification. Length is a less reliable feature, since it is only observable for objects in side lanes (large angles) at close distances, and thus cannot discriminate between classes at most locations. With distributions are more discriminating across the set of potential classification categories and serve as valuable features, requiring a good width estimation algorithm.

Therefore, there is a need in the art to provide a pre-crash sensing system that provides accurate determinations as to the presence of a potential collision target. In particular, it would be desirable to provide a system that takes into consideration the edges of the object in order to obtain its width.

SUMMARY OF THE INVENTION

In one embodiment of the present invention, there is provided a system and method for detecting edges of an object in a pre-crash sensing environment. The method includes producing from an imagery an image of a scene including the object proximate a platform, computing horizontal image derivatives of the image such that the horizontal image derivatives are a rate of change in a gradient of the image. The method also includes integrating column sums of the horizontal image derivatives to create an edge strength plot of the image and detecting peaks in the plot corresponding to dominant edges such that the dominant edges are potential pairs of left and right edges of the image. The method further includes evaluating all the potential pairs of left and right edges of the image and selecting the potential pair of left and right edges with maximum score such that the maximum score is a score with maximum integrated column sum value.

In another embodiment of the present invention, there is provided a system and method for determining the width of the object by detecting the edges of the object as described above and further calculating image coordinates of the selected pair of the left and right edges and subtracting the calculated image coordinates yielding the width of the object.

DETAILED DESCRIPTION OF THE INVENTION

Figure 1:
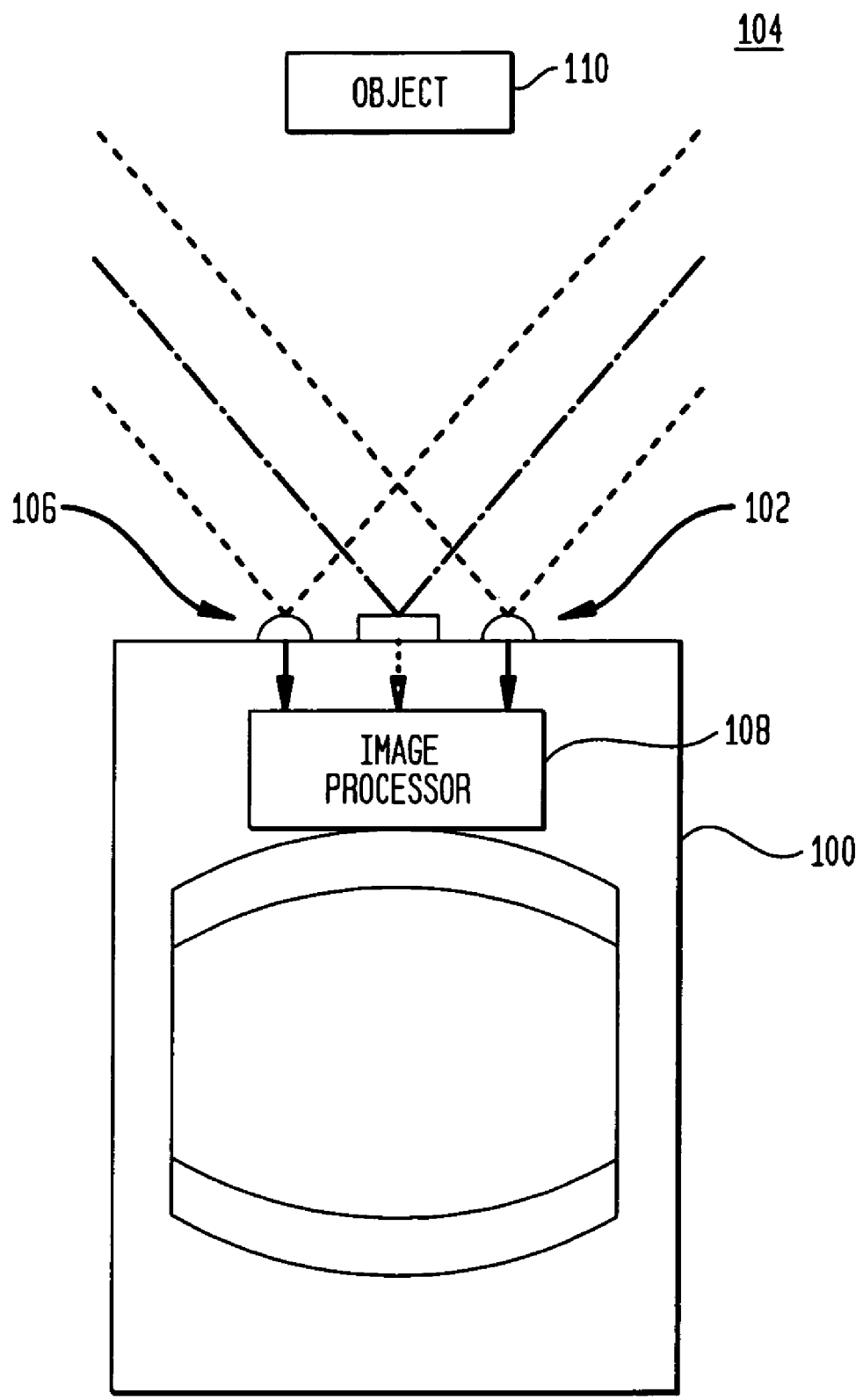
FIG. 1 depicts one embodiment of a schematic view of a vehicle having a stereo vision system in accordance with the present invention.

Referring to FIG. 1, a schematic diagram of a host; vehicle 100 having a pre-crash sensing system 102 mounted on the host vehicle 100 in accordance with principles of the present invention. The pre-crash sensing system 102 detects objects 110 within a scene 104 that is proximate the host vehicle 100. The objects 110 may preferably include pedestrians, automobiles, bikes, poles or other objects that may be a potential collision target. While FIG. 1 shows a scene 104 in front of the host vehicle 100, other pre-crash sensing systems may image scenes that are behind or to the side of the host vehicle 100. The pre-crash sensing system 102 uses a stereo vision imaging device 106 that is coupled to an image processor 108. The stereo vision imaging device 106 has a field of view that includes the object 110 and the background of the object 104.

Figure 2:
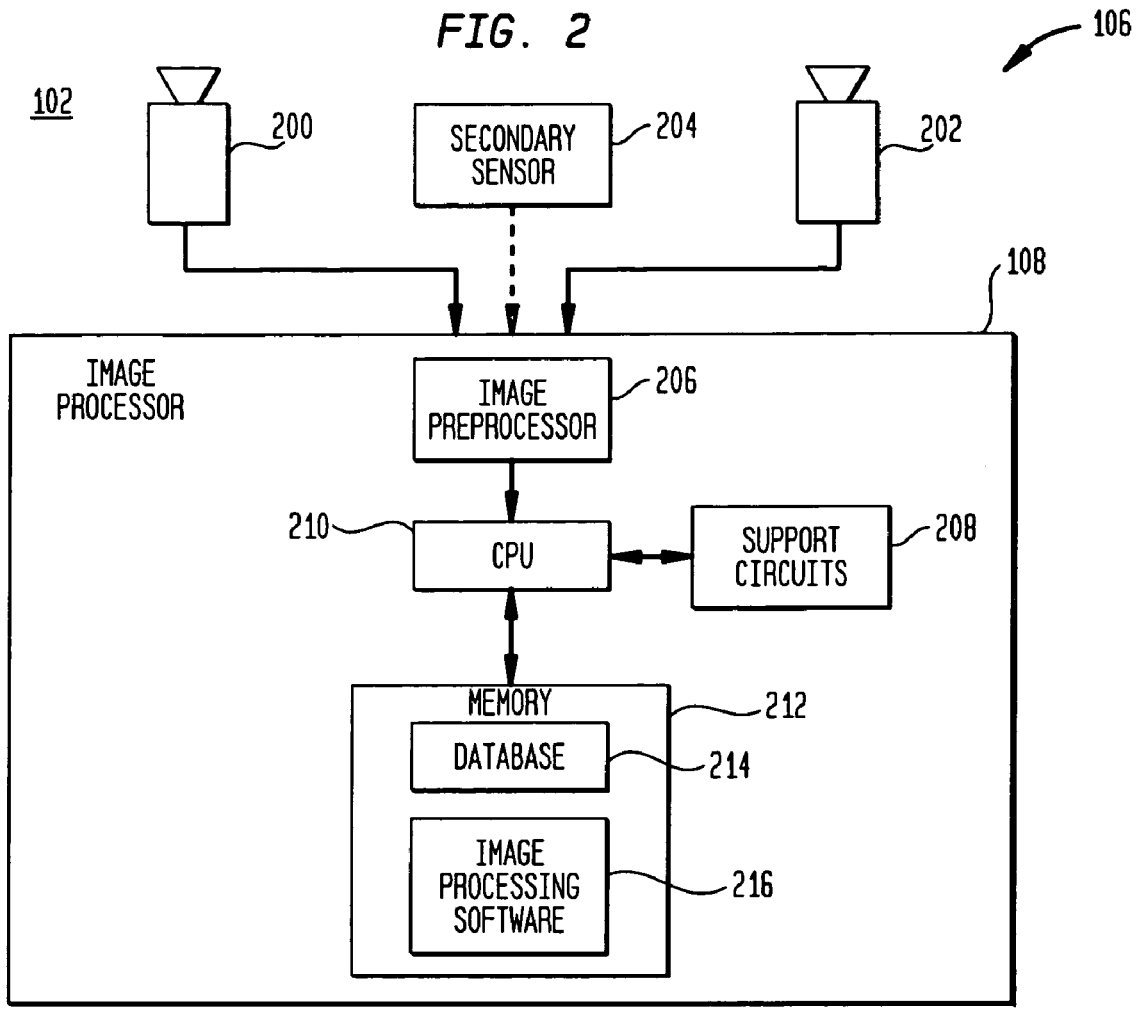
FIG. 2 depicts a block diagram of the stereo vision system of FIG. 1 in accordance with one embodiment of the present invention.

FIG. 2 depicts a block diagram of hardware used to implement the pre-crash sensing system 102. The stereo vision imaging device 106 comprises a pair of cameras 200 and 202 that generally operate in the visible wavelengths, but may be augmented with infrared sensors, or they may be infrared sensors themselves without operating in the visible range. The cameras have a known relation to one another such that they can produce a stereo image of the scene 104 from which information can be derived.

In some applications, an optional secondary sensor 204 can preferably be included. The secondary sensor 204 may be radar, a light detection and ranging (LIDAR) sensor, an infrared range finder, a sound navigation and ranging (SONAR) sensor, and the like. The secondary sensor 204 may provide additional information regarding the position of an object, the velocity of the object and the dimensions of the object 110.

The image processor 108 comprises an image preprocessor 206, a central processing unit (CPU) 210, support circuits 208, and memory 217. The image preprocessor 206 generally comprises circuitry for capturing, digitizing and processing the stereo imagery from the sensor array 106. The image preprocessor may be a single chip video processor such as the processor manufactured under the model Acadia I™ by Pyramid Vision Technologies o Princeton, N.J.

The processed images from the image preprocessor 206 are coupled to the CPU 210. The CPU 210 may comprise any one of a number of presently available high speed microcontrollers or microprocessors. The CPU 210 is supported by support circuits 208 that are generally well known in the art. These circuits include cache, power supplies, clock circuits, input-output circuitry, and the like. The memory 217 is also coupled to the CPU 210. The memory 217 stores certain software routines that are executed by the CPU 210 and by the image preprocessor 206 to facilitate the operation of the invention. The memory also stores certain databases 214 of information that are used by the invention, and image processing software 216 that is used to process the imagery from the sensor array 106. Although the invention is described in the context of a series of method steps, the method may be performed in hardware, software, or some combination of hardware and software.

Figure 3:
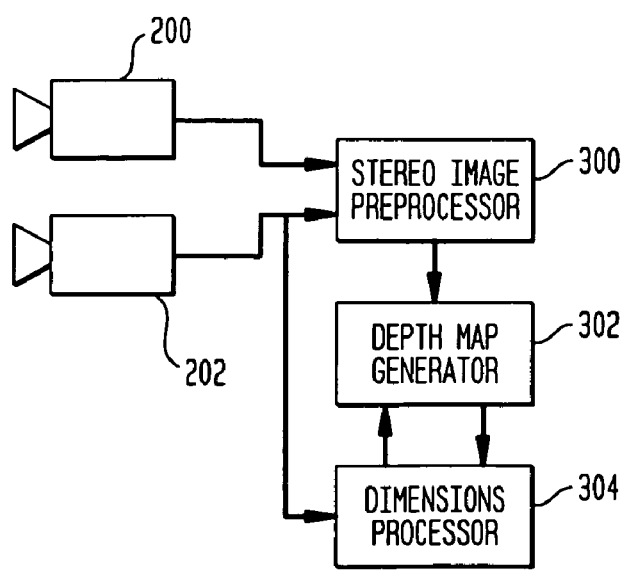
FIG. 3 depicts a functional block diagram of modules in accordance with the present invention.

FIG. 3 is a functional block diagram of modules that are used to implement the present invention. The stereo cameras 200 and 202 provide stereo imagery to a stereo image preprocessor 300 and to dimensions processor 304. The stereo image preprocessor 300 is coupled to a depth map generator 302 which is coupled to dimensions processor 304. Depth map generator 302 may be utilized to define a region of interest (ROI), i.e., an area of the image that potentially contains an object. In some applications, the depth map generator may not be used, ROIs would be determined using only image-based methods. The following will describe the functional block diagrams under the assumption that a depth map generator 302 is used. The stereo image preprocessor 300 calibrates the stereo cameras, captures and digitizes imagery, warps the images into alignment, performs pyramid wavelet decomposition, and performs stereo matching, which is generally well known in the art, to create disparity images at different resolutions.

For both hardware and practical reasons, creating disparity images having different resolutions is beneficial when detecting objects. Calibration provides for a reference point and direction from which all distances and angles are determined. Each of the disparity images contains the point-wise motion from the left image to the right image and each corresponds to a different image resolution. The greater the computed disparity of an imaged object, the closer the object is to the sensor array.

The depth map generator 302 processes the multi-resolution disparity images into a two-dimensional (2D) depth image. The depth image (also referred to as a depth map) contains image points or pixels in a 2D array, where each point represents the depth (Z coordinate in the camera coordinate system) of a point with the scene. The depth image generally provides estimated measurements of the object. Location and dimensions of the object 110 are estimated for each instance of the initial set of detection hypotheses using both intensity and range image information. First, the depth of the object in the scene 104 is refined via a median computed iteratively for all valid pixels within a minimum bounding box of the object 110 in the range image; valid pixels are determined by a decreasing depth window $z-\sigma \leq z+\sigma$, where z is the current object depth estimate, and $\sigma$ specifies the valid depth window, which is reduced by half on each iteration until a minimum window size is reached and the process converges. The depth image of the object in the scene is then processed by the dimensions processor 304 to detect the edges of the object as will be described with respect to the process flow below.

Figure 4:
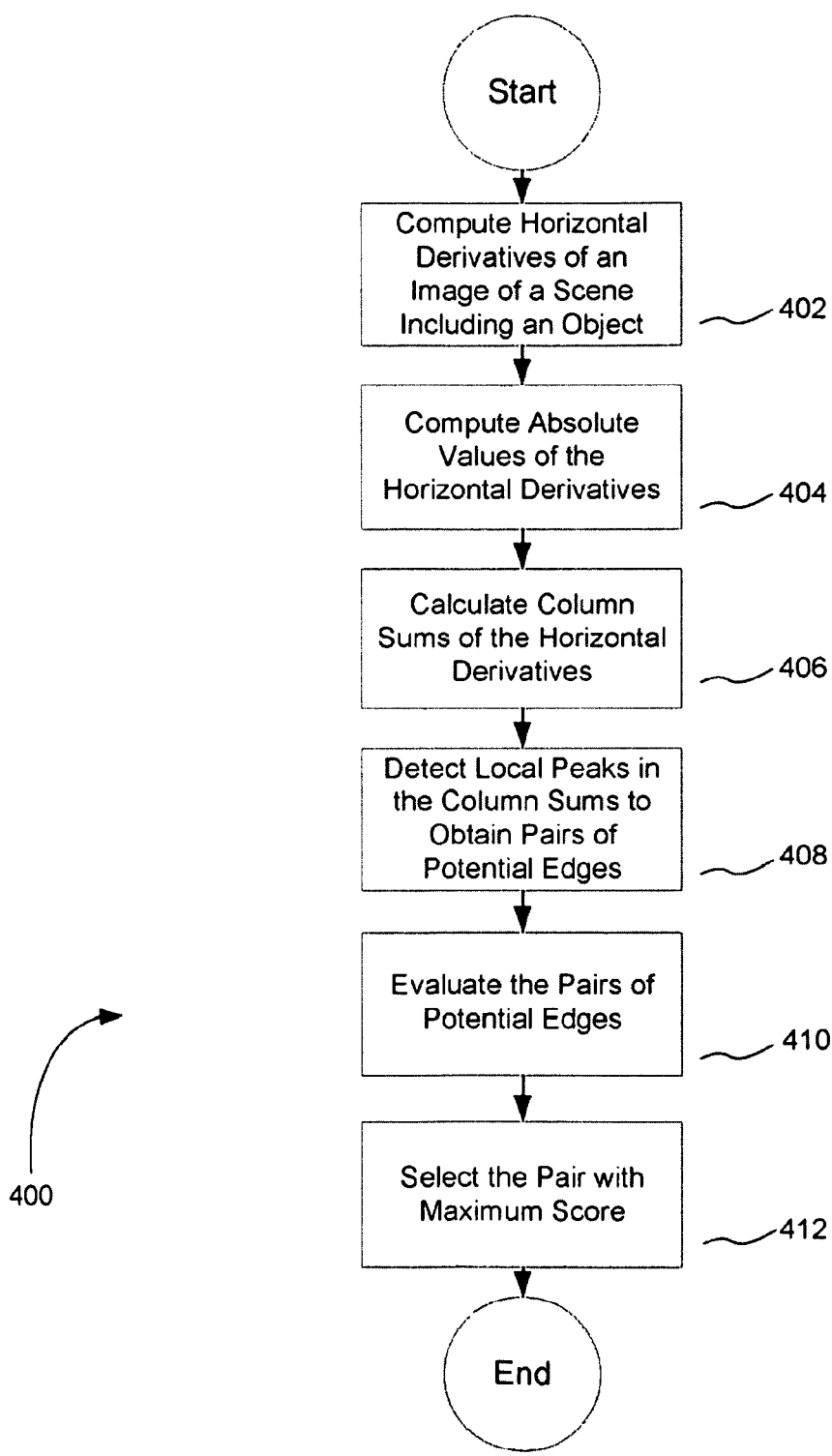
FIG. 4 illustrates a flow diagram in accordance with a method of the present invention.
Figure 5:
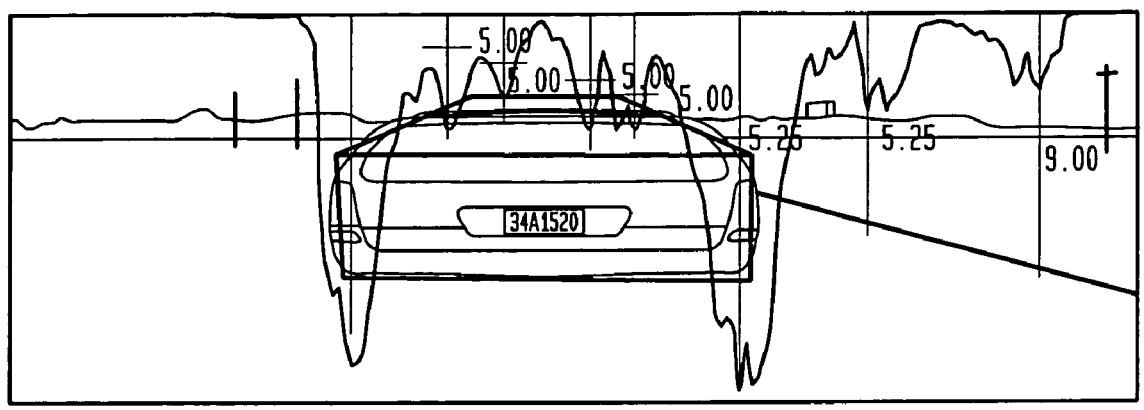
FIG. 5 illustrates an image of a vehicle with detected edges in accordance with one embodiment of the present invention.

FIG. 4 depicts a flow diagram of a method 400 for detecting a width of the object in an image. First, horizontal derivatives are computed at step 402 of the image of the object of interest which in this example is the rear image of the vehicle, e.g. a van 500 as shown in FIG. 5. The horizontal derivatives are rate of change in the gradient of the rear image of the van going from left to right or vice versa. Horizontal derivatives are simply a matrix having one or more columns that are computed pixel-wise or point-wise gradients. Next, in step 404, the absolute values of these horizontal derivatives are computed and normalized by the local gradient magnitude, yielding a measure of vertical edge strength with a degree of invariance to specularities, and other illumination artifacts. For computational efficiency, this is computed on a Gaussian filter pyramid via convolution with a Binomial approximation to a five tap Gaussian filter with co-efficient $\{1, 4, 6, 4, 1\}$ followed by a three tap gradient filter having a coefficient $\{1, 0, -1\}$. The Gaussian filter attenuates or weakens the effect of noise providing a local vertical average of the pixels without blurring over the edge. The Gaussian is thus done vertically to provide vertical edges of the object with a high gradient in the horizontal direction. The three tap gradient filter returns to signal in proportion to the strength of the edge at that pixel, Individual edges should be close to the estimated depth of the object 110. Therefore, the depth of the object determines which horizontal derivatives are included to compute column sums. Upon this determination, column sums of these horizontal derivatives are then calculated in step 406 to create an edge strength plot 502 as shown in the graphic overlay in FIG. 5. So, by integrating these gradients or adding up an average of a set of these horizontal gradients along a vertical column, one can obtain a measure of vertical edge strength of the object. As shown in FIG. 5, the edge strength plot includes signals both on the van 500 and the image scene surrounding the van. As apparent from the figure, the signal's strength is weaker for the image scene, while the strongest response is on the left and right side of the van 500 as will be described in greater detail below.

In the next stage of processing, at step 408 local peaks are detected in the column sums using a mean-shift algorithm of appropriate scale. Each pixel is described both by its range domain (gray level, RGB components . . . ) and its spatial domain (i.e. position in the image). The mean-shift algorithm finds a root of the gradient as a function of location. More specifically, mean-shift algorithm estimates the local density gradient of the similar pixels. These gradient estimates are used within an iterative procedure to find the peaks in the local density. All pixels that are drawn upwards to the same peak are then considered to be members of the same segment. Each point (column) of the plot 502 is shifted to the centroid of its local neighborhood. This process is iterated several times until a set of peaks will converge via the mean shift algorithm, resulting in small number of local peaks shown as lines 504 in FIG. 5. All columns converging to the same point are presumed to belong to the same peak, and peaks that satisfy a minimum score and region of support criteria are then selected as the local peaks 504. These local peaks 504 are preferably the potential edges with constant depth annotations.

The final step is to find a pair of potential edges that correspond to the van 500. For robust width estimation, the left/right edge pair is searched in a region of interest (ROI) which is three times the width of the object to allow for maximum detection misalignment, but a ROI of preferably twice the object's expected width is enough for many applications. So, the left/right edge pair is searched in an ROI with twice the width of the maximum object centered at the detection location, and bounded by the current top and bottom edge estimates. This is sufficient to find both edges for detections misaligned by as much as a full width of the van 500 (all cases where the initial detection physically intersects the object). For maximum reliability, the focus is on edges of the object and various means are provided to avoid other edges. Some prior data, such as the width of a typical van for example is known to be 2 meters wide. Therefore, the goal is to find a pair of edges in the local peaks 504 that correspond to this typical width of the van, allowing some for the pair of edges that are little wider or narrower than 2 meters. Finally, the pairs of potential left and right edges are evaluated at step 410 and the pair with maximum score is chosen. Only pairs resulting in likely widths are considered. Score corresponds to the strength of the integrated column sum, i.e. each edge. Each integrated column sum has a value associated with that integrated value and there is some function that combines the two into a pair. The functions is preferably a non-linear function such as multiplication, addition that combines the two integrated column sum. The 2-dimensional image coordinates of the left and right object edges are projected into the three-dimensional world coordinate system (meters) using the estimated depth and camera focal length. Since both the estimated left and right physical edges are now localized in the 3-D world coordinate system, it is now trivial to subtract the object's lateral coordinate to yield the object's width.

The step 410 of evaluating the pairs of potential edges may preferably include a pairing algorithm to match the left and right edges of the object. This will be described with respect to the object van 500 of FIG. 5. First, the distance of the van 500, i.e. the length of the van 500 from the camera is obtained from the stereo depth image. As a second check, it will look for edges that are roughly at the same distance from the camera. It looks for homogeneity of depth in integrating the column sum but also at coarser level it looks for more or less equal depth between the left and right edges of the object. For example, as shown in FIG. 5, the telephone poll appears on the right side of the image which is 9 meters (m) away from the camera, giving one good strong edge, but the telephone poll is not the object we are detecting. There is another strong edge on the right side which is the right edge of the van 500 which is 5.25 meters (m) away from the camera. It also obtains another edge on the left side of the van 500 which is also 5.25 m, but it is somewhat weaker edge. However, the pairing algorithm enforces a depth-constancy constraint that penalizes the score of a pair of edges as a function of their depth difference. This penalty function can assume many forms, such as multiplying the total score by the depth ratio of the left and right edges (note that the ratio used is always less than or equal to one), or alternately, only pairs of edges that are within a constant depth difference threshold are considered candidates for pairing. Thus, the algorithm is intelligent enough to not match the strong 10 m edge with the strong 5.25 m edge because it knows that the object would be roughly the same width and would look for edges that are roughly at the same distance from the camera. Thus the left and right 5.25 m edges of the van having the same depth would be matched. In this manner, the pairing algorithm is able to find the best pair of edges no matter what the outdoor conditions (poor lighting, bad weather such as cloudy, rainy, foggy etc.) may be.

Figure 6:
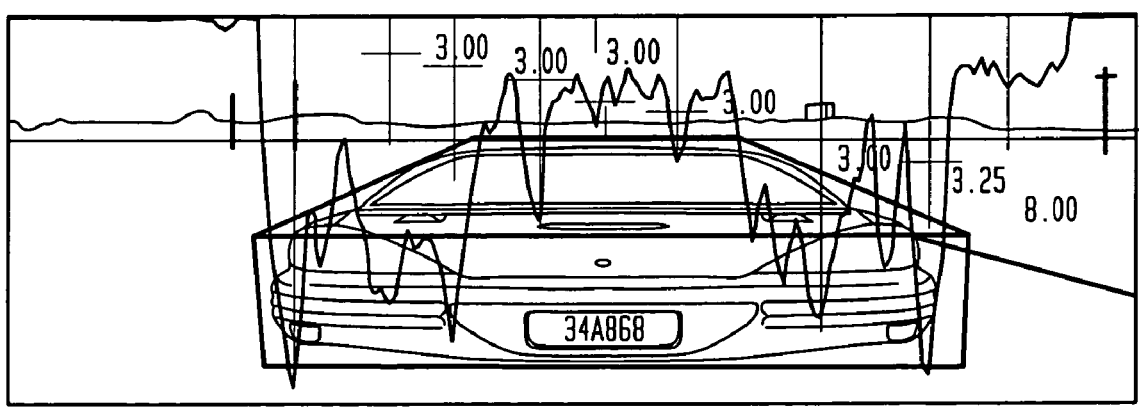
FIG. 6 illustrates an image of a vehicle with detected edges in accordance with an alternate embodiment of the present invention.

In an alternate embodiment of the present invention, there may be an object that such as a sedan 600 shown in FIG. 6 in which the front and the rear ends of the car are slanted inward making the vehicle more aerodynamic. For this type of shape of an object, the vertical edges of the sedan 600 are not strong enough to be detected. Therefore, an additional search is performed on each pair of edges to support the inward slant for the top half of the left and right edges of this sedan 600. For this search, the horizontal derivatives are computed similar to the van 500 of figure 5 for the bottom half of the left and right edges of the sedan 600. However for the top half of the left and right edges of the sedan 600, horizontal derivatives are computed at 45 and 135 degree orientations, respectively. In other words, you trace a contour 602 from the top left to the top right of the sedan 600 and then trace a 45 degree line on the left part of the contour 602 and a 135 degree line on the right part of the contour 602. So, in this scenario, the search is refined to look for both the vertical half of the edge and the slanted inward half of the edge on both left and right sides of the sedan 600. The column sum is replaced with the sum along the contour of the sedan 600, i.e. vertical for the bottom half and slanted for the top half, which is then computed to create an edge strength plot 604 as shown in the graphic overlay in FIG. 6.

The present invention benefits from several observations such as vehicle traffic is in-lane, thus the rear face is typically visible for reliable width estimation (barring occlusion, partial visibility from field-of-view clipping, etc.); pedestrian motion and orientation is less constrained, however, pedestrian width and length is very similar (functionally equivalent), making width estimation for pedestrians orientation independent. Thus, it is generally sufficient to search for the left- and right-most visible edges regardless of the object class. As discussed above, the present invention then exploits the following properties; the left and right edges typically produce strong horizontal image derivatives (due to contrast between the object and background intensities, tail-lights, trim, etc.) and the invention can therefore use image gradients to assist in our edge searches; the left and right visible edges should be at a similar depth in the scene and will have good/dense stereo estimates (due to their high contrast) to determine this; and left and right edges resulting in implausible widths (with respect to the classification categories) need not be considered. It is understood that the above-described embodiments are illustrative of only a few of the many possible specific embodiments, which can represent applications of the invention. Numerous and varied other arrangements can be made by those skilled in the art without departing from the spirit and scope of the invention.

The invention claimed is:

1. A computer-implemented method for detecting edges of an object, the method comprising:
   computing horizontal image derivatives of an image, wherein the horizontal image derivatives are a matrix having two or more columns that are computed pixel-wise or point-wise;
   integrating column sums of the horizontal image derivatives to create an edge strength plot of the image;
   detecting peaks in the edge strength plot corresponding to dominant edges, wherein the dominant edges are potential pairs of left and right edges of the object; and
   selecting a potential pair of left and right edges with a maximum paired edge score wherein the maximum paired edge score comprises a combination of integrated column sum values.

2. The method of claim 1 further comprising producing from imagery a depth image of a scene, wherein said depth image determines the horizontal image derivatives to be included in the column sum to be integrated.

3. The method of claim 1 further comprising calculating image coordinates of the selected left and right edges.

4. The method of claim 3 further comprising subtracting the calculated image coordinates to obtain a width of the object.

5. The method of claim 4 further comprising determining top and bottom edge estimates of the object.

6. The method of claim 5 further comprising searching for a pair of left and right edges having image coordinates to be twice the width of the object and bounded by said top and bottom edge estimates.

7. The method of claim 1 further comprising computing and normalizing absolute values of the horizontal derivatives to provide edges with a high gradient.

8. The method of claim 1 wherein the potential paired left and right edges include said combinations that fall within a constant depth difference threshold.

9. The method of claim 1 wherein the selecting step further includes multiplying the paired edge score by a depth ratio of the potential left and right edges wherein the depth ratio is less than or equal to one.

10. The method of claim 1 wherein the peaks are detected using a mean-shift algorithm.

11. The method of claim 1 wherein the integrating step includes calculating vertical column sums of the horizontal image derivatives.

12. The method of claim 1 wherein the integrating step includes calculating angular column sums of the horizontal image derivatives.

13. The method of claim 1 wherein the integrating step includes calculating vertical column sums and angular column sums of the horizontal derivatives.

14. A computer-implemented method for determining a width of an object, the method comprising:
  computing horizontal image derivatives of an image, wherein the horizontal image derivatives are a matrix having two or more columns that are computed pixel-wise or point-wise;
  integrating column sums of the horizontal image derivatives to create an edge strength plot of the image;
  detecting peaks in the edge strength plot corresponding to dominant edges, wherein the dominant edges are potential pairs of left and right edges of the object;
  selecting a pair of left and right edges with a maximum paired edge score, wherein the maximum paired edge score comprises a combination of integrated column sum values;
  calculating image coordinates of the selected pair of the left and right edges; and
  subtracting the calculated image coordinates yielding the width of the object.

15. The method of claim 14 further comprising producing from imagery a depth image of a scene wherein said depth image determines the horizontal image derivatives to be included in the column sum to be integrated.

16. The method of claim 14 further comprising determining top and bottom edge estimates of the object.

17. The method of claim 14 further comprising searching for a pair of left and right edges having image coordinates to be twice the width of the object and bounded by said top and bottom edge estimates.

18. The method of claim 14 further comprising computing and normalizing absolute values of the horizontal derivatives to provide edges with a high gradient.

19. The method of claim 14 wherein the potential paired left and right edges include said combinations that fall within a constant depth difference threshold.

20. The method of claim 14 wherein the selecting step further includes multiplying the paired edge score by a depth ratio of the potential left and right edges wherein the depth ratio is less than or equal to one.

21. The method of claim 14 wherein the peaks are detected using a mean-shift algorithm.

22. The method of claim 14 wherein the integrating step includes calculating vertical column sums of the horizontal image derivatives.

23. The method of claim 14 wherein the integrating step includes calculating angular column sums of the horizontal image derivatives.

24. The method of claim 14 wherein the integrating step includes calculating vertical column sums and angular column sums of the horizontal derivatives.

25. A pre-crash sensing system, comprising:
  a dimensions processor for determining edges of an object from an image;
  wherein said dimensions processor computes horizontal image derivatives of the image, the horizontal image derivatives are a matrix having two or more columns that are computed pixel-wise or point-wise
  wherein said dimensions processor integrates column sums of the horizontal image derivatives to create an edge strength plot of the object;
  wherein said dimensions processor detects peaks in the edge strength plot corresponding to dominant edges, the dominant edges are potential pairs of left and right edges of the object; and
  wherein said dimensions processor selects a pair of left and right edges with a maximum paired edge score, wherein the maximum paired edge score comprises a combination of integrated column sum values.

26. The system of claim 25 further comprises a depth map generator for producing a depth image of a scene, wherein said depth image determines the horizontal image derivatives to be included in the column sum to be integrated.

27. The system of claim 25 further comprises a stereo image preprocessor for preprocessing said imagery.

28. The system of claim 25 wherein the dimensions processor calculates image coordinates of the selected pair of left and right edges and subtracts said image coordinates to yield a width of the object.

29. The system of claim 25 wherein said dimensions processor integrates said column sums by calculating vertical column sums of the horizontal image derivatives.

30. The system of claim 25 wherein said dimensions processor integrates said column sums by calculating angular column sums of the horizontal image derivatives.

31. The system of claim 25 wherein said dimensions processor integrates said column sums by calculating vertical columns sums and angular column sums of the horizontal image derivatives.

32. A computer readable storage medium having stored thereon a plurality of instructions which, when executed by a processor, cause the processor to perform the steps of a method for determining edges of an object in an image of a scene including the object, comprising:
  computing horizontal image derivatives of the image of an object, wherein the horizontal image derivatives are a matrix having two or more columns that are computed pixel-wise or point-wise;
  integrating column sums of the horizontal image derivatives to create an edge strength plot of the image;

detecting peaks in the edge strength plot corresponding to dominant edges, wherein the dominant edges are potential pairs of left and right edges of the object; and selecting a pair of left and right edges with a maximum paired edge score, wherein the maximum paired edge selecting the pair of left and right edges with maximum paired edge score, wherein the maximum paired edge score comprises a combination of integrated column sum values.

33. A computer-implemented method for detecting edges of an object in an image of a scene, the method comprising the steps of:

computing, based on the image, horizontal image derivatives comprising a matrix having two or more columns that are computed pixel-wise or point-wise;

integrating column sums of the matrix to create an edge strength plot of the image;

detecting potential pairs of left and right edges of the object in the edge strength plot; and selecting a pair of left and right edges having a maximum paired edge score comprising a combination of integrated column sum values.

34. The method of claim 33 further comprising calculating image coordinates of the selected left and right edges.

35. The method of claim 34 further comprising subtracting the calculated image coordinates to obtain a width of the object.

36. The method of claim 35 further comprising determining top and bottom edge estimates of the object.

37. The method of claim 33 further comprising computing and normalizing absolute values of the horizontal derivatives to provide edges with a high gradient.

* * * * *